US007173516B2

(12) United States Patent
Mullet et al.

(10) Patent No.: US 7,173,516 B2
(45) Date of Patent: Feb. 6, 2007

(54) OPERATING SYSTEM FOR A MOTORIZED BARRIER OPERATOR

(75) Inventors: Willis J. Mullet, Gulf Breeze, FL (US); David B. Davies, Pace, FL (US); Mikael Bäckström, Chicago, IL (US); Eric Wilmot, Chicago, IL (US); Keith Alsberg, Chicago, IL (US); James S. Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 230 days.

(21) Appl. No.: 10/773,479

(22) Filed: Feb. 6, 2004

(65) Prior Publication Data

US 2005/0176400 A1 Aug. 11, 2005

(51) Int. Cl.
*G05B 19/00* (2006.01)
*H02P 1/00* (2006.01)

(52) U.S. Cl. ...................................... 340/5.71; 318/280

(58) Field of Classification Search ............... 340/5.71, 340/54, 5.31, 64, 5.7, 26, 825.72, 825.69, 340/309.8; 318/446, 283, 285, 280, 282, 318/4; 700/90; 49/30, 139
See application file for complete search history.

(56) References Cited

U.S. PATENT DOCUMENTS

| | | | |
|---|---|---|---|
| 4,035,702 A | 7/1977 | Pettersen et al. | 318/285 |
| 4,119,896 A | 10/1978 | Estes, III et al. | 318/266 |
| 4,247,806 A | 1/1981 | Mercier | 318/267 |
| 4,463,292 A | 7/1984 | Engelmann | 318/283 |
| 4,607,312 A | 8/1986 | Barreto-Mercado | 361/172 |

(Continued)

OTHER PUBLICATIONS

*International Door & Operator Industry*, Summer 1998, cover and pp. 3, 56, 57, 100 & 133.

(Continued)

*Primary Examiner*—Wendy R. Garber
*Assistant Examiner*—William Bangachon
(74) *Attorney, Agent, or Firm*—Renner Kenner Greive Bobak Taylor & Weber

(57) ABSTRACT

An operating system which utilizes a multi-functional wall station for a motorized barrier includes an operator for controlling movement of a barrier between various positions. The operator may receive signals from a wireless or wired wall station transmitter, a wireless keyless entry device and/or a portable remote transmitter device. The multi-function wall station provides for selective concealment of certain switches or buttons which are not commonly used in the day-to-day operation of a wall station. For example, the up/down switch may be actuated by a hinged cover which conceals other selected operational buttons and wherein those operational buttons are only accessed upon opening of the hinged cover. The wall station also provides a periodic lighting element so as to easily direct the user to push the hinge cover to initiate up/down movement of the barrier. The multi-function wall station also provides for an operational selection wherein the door may be closed in a normal manner; by an auto-close feature, wherein the door closes after a predetermined period of time; or a RF block mode, wherein the station prevents transmission of any remote radio frequency signals to the operating system. The auto-close feature may only be enabled upon actuation of a keyless entry device so as to allow the user to re-enter the garage in the unfortunate circumstance of being locked out of the garage.

23 Claims, 6 Drawing Sheets

U.S. PATENT DOCUMENTS 4,808,995 A 2/1989 Clark et al. ............ 340/825.69
4,821,024 A * 4/1989 Bayha ..................... 340/309.8
4,887,205 A 12/1989 Chou ......................... 364/400
4,939,434 A 7/1990 Elson ......................... 318/285
5,027,553 A * 7/1991 Vergara ......................... 49/30
5,086,385 A 2/1992 Launey et al. .............. 364/188
5,357,183 A 10/1994 Lin ............................ 318/468
5,388,691 A * 2/1995 White ........................ 206/305
5,576,701 A * 11/1996 Heitschel et al. .......... 340/5.31
5,848,634 A 12/1998 Will et al. .................. 160/310
5,864,297 A 1/1999 Sollestre et al. ....... 340/825.31
6,070,361 A 6/2000 Paterno ......................... 49/14
6,121,889 A * 9/2000 Janda et al. ........... 340/815.47
6,326,754 B1 12/2001 Mullet et al. ............... 318/480
6,437,527 B1 * 8/2002 Rhodes et al. .............. 318/280
6,608,253 B1 8/2003 Rintz .......................... 174/66
6,819,071 B2 11/2004 Graham et al. ............. 318/442
2003/0102836 A1 6/2003 McCall ....................... 318/445
2003/0227370 A1 12/2003 Brookbank et al. .......... 340/5.7
2004/0135531 A1 7/2004 Graham et al. ............. 318/442
2004/0216379 A1 11/2004 Gioia et al. ..................... 49/29
2005/0218854 A1 10/2005 Giola et al. ................. 318/599

OTHER PUBLICATIONS

Advertising brochure entitled "Let's put our heads together.", ©1994 GMI.

Page 26 of Home Automation Systems catalog (date unknown).

Printout fromURL http://www.smarthome.com/7137.html (date unknown).

Printout fromURL http://www.garagedoorsecurity.com/product.html (date unknown).

User guide by Mind Ease (date unknown).

Printout fromURL Http://www.commtechresearch.com (date unknown).

* cited by examiner

OPERATING SYSTEM FOR A MOTORIZED BARRIER OPERATOR

TECHNICAL FIELD

Generally, the present invention relates to a garage door operator system for use on a closure member moveable relative to a fixed member. More particularly, the present invention relates to a wall station transmitter for controlling the operation of a movable barrier, such as a gate or door, between a closed position and an open position. More specifically, the present invention relates to a wired or wireless wall station control for a door or gate operator, wherein the wall station has a plurality of buttons or touch pad keys which may be selectively concealed, and wherein actuation of a button implements a corresponding function of the operating system. One function in particular provides an auto-close function which automatically closes the movable barrier after a pre-determined period of time.

BACKGROUND ART

As is well known, garage doors or gates enclose an area to allow selective ingress and egress to and from the area. Garage doors initially were moveable by hand. But due to their weight and the inconvenience of opening and closing the door, motors are now connected to the door. Control of such a motor may be provided by a hard-wired push button which, when actuated, relays a signal to an operator controller that starts the motor and moves the door in one direction until a limit position is reached. After the door has stopped and the button is pressed again, the motor moves the door in an opposite direction. Garage door operators are now provided with safety features which stop and reverse the door travel when an obstruction is encountered. Other safety devices, such as photocells and sensors, detect whenever there is an obstruction within the path of the door and send a signal to the operator to take corrective action. Remote control devices are now also provided to facilitate the opening and closing of the door without having to get out of the car. The prior art also discloses various other features which enhance the convenience of opening and closing a garage door as follows.

U.S. Pat. No. 4,119,896, to Estes, III et al., discloses a sequencing control circuit provided for a door operator motor which is connected to open and close a garage door as controlled by signals from manual switches and load switches. The sequencing control circuit includes time means with a first time period in the order of six to eight seconds. This permits a person to hold a push button switch closed for about six to eight seconds so that a slab door may be opened against a snow drift which otherwise would have so much torque requirement on the motor that an overload switch would stop the motor. Enabling means is provided to enable the motor during this time period yet to disable the constant signal from the push button for periods longer than this time period so that the door operator motor then is responsive to signals from the load switches. The sequencing control circuit also includes a latch circuit having an output in a feedback loop to maintain the latch circuit latched upon a momentary input control signal. This allows time for the motor to accelerate the load to a normal running condition and to open any closed limit switch or closed torque switch during this acceleration period.

U.S. Pat. No. 4,247,806, to Mercier, discloses a garage door opener including a radio receiver and a push button, each operable to initiate a pulse for effecting a switching device which, in turn, energizes a latching relay. Operation of the latching relay completes an energizing circuit to the appropriate winding of a reversible motor which moves the door toward an open or closed position. A sensing circuit is operable for effecting the reversal of the latching relay to change the direction of motor operation in the event the door engages an object in its path. A foot switch may also be provided for positively sensing an obstacle and reversing the drive motor. A transmitter may be provided with an impulse circuit to limit the duration of the system actuating signal regardless of how long the transmitter push button is depressed.

U.S. Pat. No. 4,607,312, to Barreto-Mercado, discloses a system that eliminates the conventional automobile door and trunk locks and provides power operated locks remotely controlled by a VHF radio transmission which is coded with two code signals, one of which energizes the door locks to locking condition and the other of which causes door or trunk unlocking, the trunk unlocking being activated only if a trunk transfer push button switch has been operated. The unlocking code may also activate the electric power to the engine starter motor, hood and manual switches of the power door operating motor. The system provided by the invention for unlocking or locking the doors of an automobile and for unlocking the trunk and hood of the same automobile as well as the engine electric power, all from outside the automobile permits the removal of the conventional mechanical door locking mechanism, including both the external key-operated apparatus and that controlled by an internal push button, and the removal of the conventional key-operated mechanical trunk lock, and the substitution of an externally operable radio controlled lock and unlock system for the door and an unlock system for the trunk and hood.

U.S. Pat. No. 4,808,995, to Clark et al., discloses a radio remote-controlled door operator for use, among other uses, as a residential garage door operator. The transmitter contains two buttons, one to produce normal door operation and the other to set the operator into a "secure" mode, wherein it will be non-responsive to further valid operating codes until reset. In addition, a second deeper level of security may be established by means of a vacation switch which disconnects the operator from the AC power supply. The operator system comprises a microprocessor which is programmed to perform various accessory functions even through the accessories may not be present. Various microprocessor inputs are tied to a false "safe" level so that even though the accessory programs are run, no outputs result and no interference with normal door operation is produced.

U.S. Pat. No. 5,086,385, to Launey et al., discloses a system for and a method of providing an expandable home automation controller which supports multiple numbers and multiple different types of data communications with both appliances and subsystems within the home as well as systems external to the home. The system is based upon a central processor, such as a microprocessor-based computer, and is connected by means of a data bus to control the various products and subsystems within a home or commercial building, such as lighting systems, security systems, various sensors, multiple external terminals, as well as to allow for the input of commands by a variety of means such as touch-screens, voice recognition systems, telephones, custom switches or any device capable of providing an input to a computer system. The system functions can be readily controlled by the user utilizing a high resolution graphics display and associated touch-screen interface.

U.S. Pat. No. 5,848,634, to Will et al., discloses an apparatus for controlling operation of a motorized window shade, the apparatus comprising a drive circuit for driving an electric motor operating the window shade; and a control circuit for controlling the operation of the driver circuit, the control circuit including a microprocessor. The microprocessor is coupled to first and second switches for enabling driving of the electric motor in respective first and second directions corresponding to upward and downward movement of the window shade. The apparatus also includes a program switch, wherein the microprocessor of the control circuit is programmed to allow setting of the upper and lower limits of travel of the window shade. The microprocessor is also programmed with a program to set a first of the limits of travel. The window shade is adjusted to a desired upper or lower level limit position using at least one of the first and second switches, the program switch is then actuated followed by the actuation of one of the first and second switches to set a first of the limits. The window shade is then adjusted to a desired position for a second of the limits using at least one of the first and second switches. The program switch is again actuated, and the other of the first and second switches is actuated to set the second of the limits.

U.S. Pat. No. 5,864,297, to Sollestre et al., discloses a remote keyless entry system including a remote key fob or transmitting unit which may be carried by the user. This fob may transmit coded function signals directing the vehicle to perform requested functions, e.g., unlock the doors, and an on-board receiver that receives the request and performs the function. The receiver may be reprogrammed by the customer to accept signals from a different transmitter in the event that the key fob is either lost or stolen. To program the receiver, the system is put in a programming mode by using a transmitter whose security code is already stored within the receiver. This programming mode is entered by depressing specified buttons on the transmitting unit for a predetermined amount of time. Once in the programming mode, all previous security codes are erased, and a new transmitting unit code may be programmed into the receiver by depressing any button on that unit. The receiver will chime to acknowledge to the customer that the new security code has been accepted.

U.S. Pat. No. 6,326,754 to Mullet, et al. discloses a wireless operating system utilizing a multi-functional wall station for a motorized door/gate operator includes an operator for controlling the movement of a door/gate between various positions. The system has an operator with a receiver and a wall station transmitter for transmitting a signal to the receiver. The signal initiates separate operator functions in addition to opening and closing of the door/gate. A remote transmitter may send a remote signal received by the receiver, wherein the receiver is capable of distinguishing between the wall station signal and the remote signal. The wall station includes a transmitter programming button, wherein actuation of the transmitter programming button places the receiver in a learn mode, and wherein subsequent actuation of the remote transmitter positively identifies the remote transmitter for use with the operator. A light powered by the operator and a light actuation button provided by the wall station transmitter is included in the system. Actuation of the light actuation button functions to switch the light on or off. A pet height button, provided by the wall station transmitter, selectively positions the height of the gate/door from its fully closed position to allow ingress and egress of a pet. A delay-close button closes the door/gate after a predetermined period of time. Actuation of a door installation button sequences the door/gate and said operator through various operational parameters to establish a door operating profile. All of the buttons on the wall station are exposed which allows some of them to be accidentally actuated. A keyless entry transmitter and a second wall station may also control the operator.

The systems described above are lacking inasmuch as various control elements are provided in different locations. Some are provided at the operator head and some are added on and separate from a main control button or wall station. The add-on devices are susceptible to failure or damage and as such may interfere with the normal operation of system. And if the add-on device is in proximity to other devices the possibility of inadvertent button actuation is substantially increased. This is also true of the few devices which do provide all functions in one location. Indeed, current systems are simply not user friendly in that they can not be seen in the dark nor do they provide sufficient tactile distinctions to enhance their use. Nor do current systems provide an integrated auto-close feature in conjunction with other functions provided on a multi-function wall station. And these systems do not provide both the ability to easily disconnect and/or adjust the timing of the auto-close feature. Finally, the systems do not provide an auto-close feature that can only be enabled if a keyless entry transmitter or other remote transmitter is also taught to the operating system. In summary, current movable barrier operator systems do not provide a complete and integrated functional wall station that is ergonomically designed and efficient in use and operation.

DISCLOSURE OF INVENTION

It is thus an object of the present invention to provide a wireless transmitter for a door or gate that moves between an open and closed position. The door or gate is of the type that is moveable into an out-of-proximity position with respect to a fixed surface that is to be sealed relative to the door. The door or gate is coupled to a motorized operator which controls movement of the door. It is another object of the present invention to provide a wireless wall station transmitter which provides multiple functions in addition to the open/close function initiated by the motorized operator. It is a further object of the present invention to provide a wireless wall station transmitter device which is powered by a battery or other power source. It is yet another object of the present invention to provide a wireless wall station transmitter which is mountable anywhere in communication range of the motorized operator which controls the up and down movements of the door or gate and various other features associated with the door. It is yet another object of the present invention to provide a receiver coupled to the motorized operator to decode instructions sent from the wall station transmitter. It is still a further object of the present invention to provide a receiver which can handle multiple function instructions.

Yet still a further object of the present invention is to provide a radio frequency controlled wireless wall station for controlling the operational parameters of a door or gate operator that contains a plurality of switches or buttons to provide a plurality of functions and features. The wall station transmits an initial signal that sets a series of coded signals during installation and once the encoded series is set, each additional coded message within the coded set designates a separate function. These functions include, but are not limited to, the directional movement of the motorized object; the off and on function of the lights associated with the operator; the initiation of an operational profile, which is used to establish safety limits and the like; the initiation of a delay-to-close time; the raising of the door to a height that allows pet egress; and the learn function programming of additional remote transmitters and remote keyless entry pads.

Yet another object of the present invention is to provide additional functions which may include an auto-close feature wherein the auto-close feature is provided with an operator-set or a user-adjustable time period for allowing a door or barrier to remain open for a period of time prior to beginning of closure of the barrier. Still another function may provide for blocking of all other wireless or remote transmitters such that a wall station transmitter is the only transmitter recognized by the operator system. Still yet another object of the present invention is to provide a function that permits the auto-close feature to only be enabled if a keyless transmitter is taught to the operator system. Still yet another object of the present invention is to provide an auto-close feature that is enabled only if a signal is previously received from a remote transmitter or a keyless transmitter.

Still further objects of the present invention allow for a wall station to provide a plurality of buttons wherein a certain plurality of buttons are concealed from immediate use. Yet another object of the present invention is to provide a wall station transmitter wherein selected buttons of the transmitter are illuminated for easy identification in a dimly lit environment. Still yet another object of the present invention is to provide for a wall station which provides a cover that is used to conceal the certain plurality of buttons and wherein the cover is movable in the concealing position to allow for actuation of at least one of or a selected number of the concealed buttons. Still yet another object of the present invention is to provide for a wall station wherein the cover that is utilized to conceal at least some of the buttons is selectively illuminated. Another object of the present invention is to provide a detachable cover to enclose batteries within a battery compartment of the wall station housing.

In general, the present invention contemplates an operator system for moving a barrier comprising a motor for moving the barrier between opened and closed positions; an operator for controlling operation of the motor; and a wall station having a wall station transmitter for sending operational signals to the operator, the wall station having an open/close button for actuating the motor to move the barrier in the appropriate direction, the wall station also having a manual-close/auto-close selector button, wherein if an auto-close mode is selected the operator automatically closes the barrier if left open for a predetermined period of time.

The present invention also contemplates an operator system for moving a barrier comprising a motor for moving the barrier between opened and closed positions; an operator for controlling operation of the motor; and a wall station having a wall station transmitter for sending operational signals to the operator, the wall station having an open/close button for actuating the motor to move the barrier in the appropriate direction, and the wall station also having an auto-close blocking selector button which, if enabled, precludes the operator from receiving operational signals from any source other than the wall station.

The invention also contemplates an operator system for moving a barrier comprising a motor for moving the barrier between opened and closed positions; an operator for controlling operation of the motor; a wireless wall station having a wall station transmitter for sending operational signals to the operator, the wireless wall station having an open/close button for actuating the motor to move the barrier in the appropriate direction; and a light source illuminating the wireless wall station from within.

The invention further contemplates an operator system for moving a barrier comprising a motor for moving the barrier between opened and closed positions; an operator for controlling operation of the motor; and a wall station having a wall station transmitter for sending operational signals to the operator from a single transceiver, the wall station having an open/close button for actuating the motor to move the barrier in the appropriate direction; the wall station also having a blocking selector button which, if enabled, precludes the operator from receiving operational signals from any source other than the wall station transmitter, the wall station including a panel carrying the open/close switch and the selector switch, and a cover positionable with respect to the panel, wherein the cover in a first position permits access to the switch and in a second position conceals said switches but allows actuation of the open/close switch.

The invention further contemplates an operator system for moving a barrier comprising a motor for moving the barrier between opened and closed positions; an operator for controlling operation of the motor; and a wall station having a wall station transmitter for sending operational signals to the operator, the wall station having an open/close button for actuating the motor to move the barrier in the appropriate direction; the operator capable of receiving operational signals from the wall station transmitter and any programmed transmitter; the wall station also having a manual-close/auto-close/block button, wherein if a manual-close mode is selected the operator only closes the door upon receipt of a door close signal from one of the wall station and the programmed transmitter, wherein if an auto-close mode is selected, the operator automatically closes the barrier if left open for a predetermined period of time; and wherein if a block mode is selected, the operator is precluded from receiving operational signals from any source than the wall station transmitter.

And the present invention contemplates a wall station for transmitting signals to an operator that moves a motorized barrier, comprising a panel; an open/close button carried by the panel, wherein actuation of the open/close button causes the operator to move the barrier in an appropriate direction; at least one other function button carried by the panel, wherein actuation of the other function button causes the operator to perform the corresponding function; and a cover positionable with respect to the panel, wherein the cover in a first position permits access to the buttons and in a second position conceals the buttons but allows actuation of the open/close button.

The invention further contemplates a wall station transmitter for sending operational signals to an operator that controls movement of a barrier comprising a housing having a battery compartment, the housing having a ledge at one end of the battery compartment and a ridge at an opposite end of the battery compartment, the ledge having a groove adjacent a nub, and the ridge having a notch; and a battery cover that detachably encloses the battery compartment, the cover having a catch at one end and a latch of an opposite end, the latch mateably received in the notch and the catch mateably received by the groove.

BRIEF DESCRIPTION OF THE DRAWINGS

For a complete understanding of the objects, techniques and structure of the invention, reference should be made to the following detailed description and accompanying drawings, wherein.

PREFERRED EMBODIMENT FOR CARRYING OUT THE INVENTION

Figure 1:
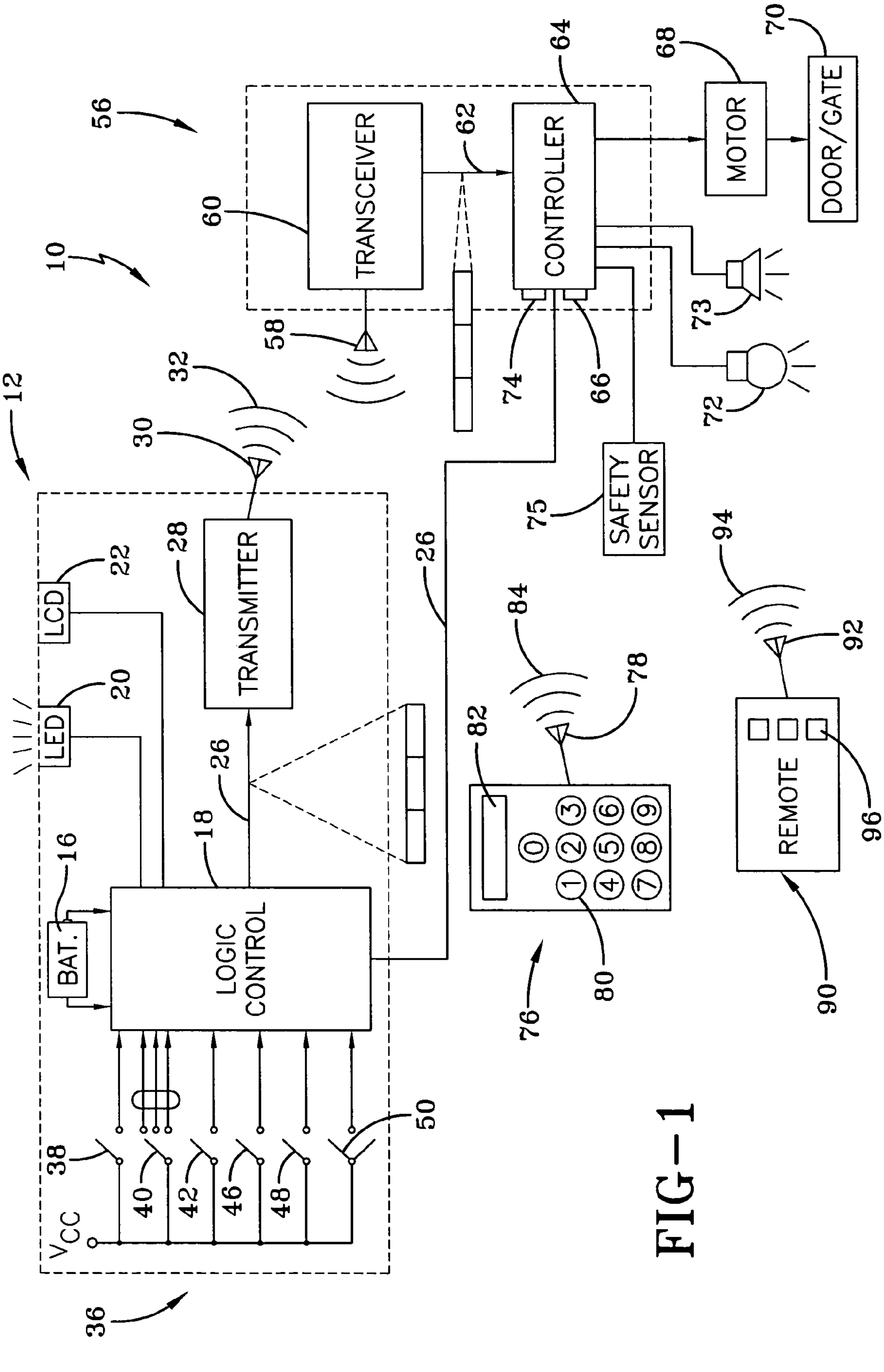
FIG. 1 is an operational system for a motorized barrier operator according to the present invention.
Figure 3:
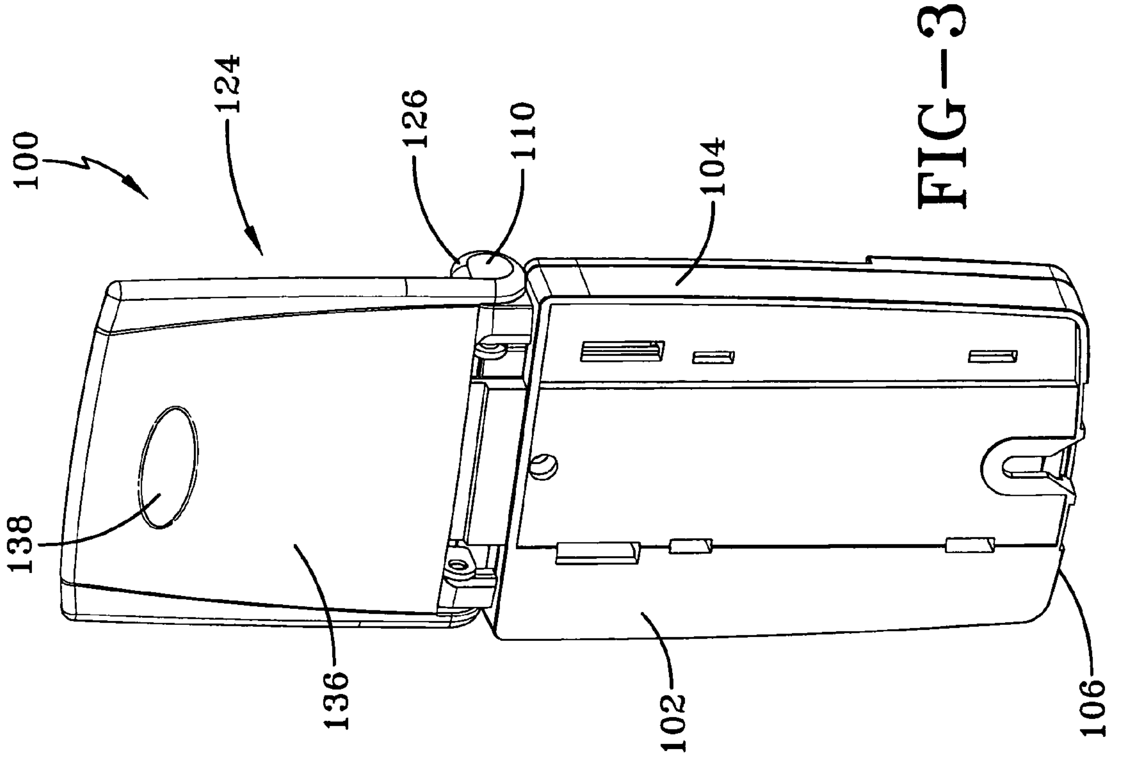
FIG. 3 is a rear perspective view of the multi-function wall station.
Figure 2:
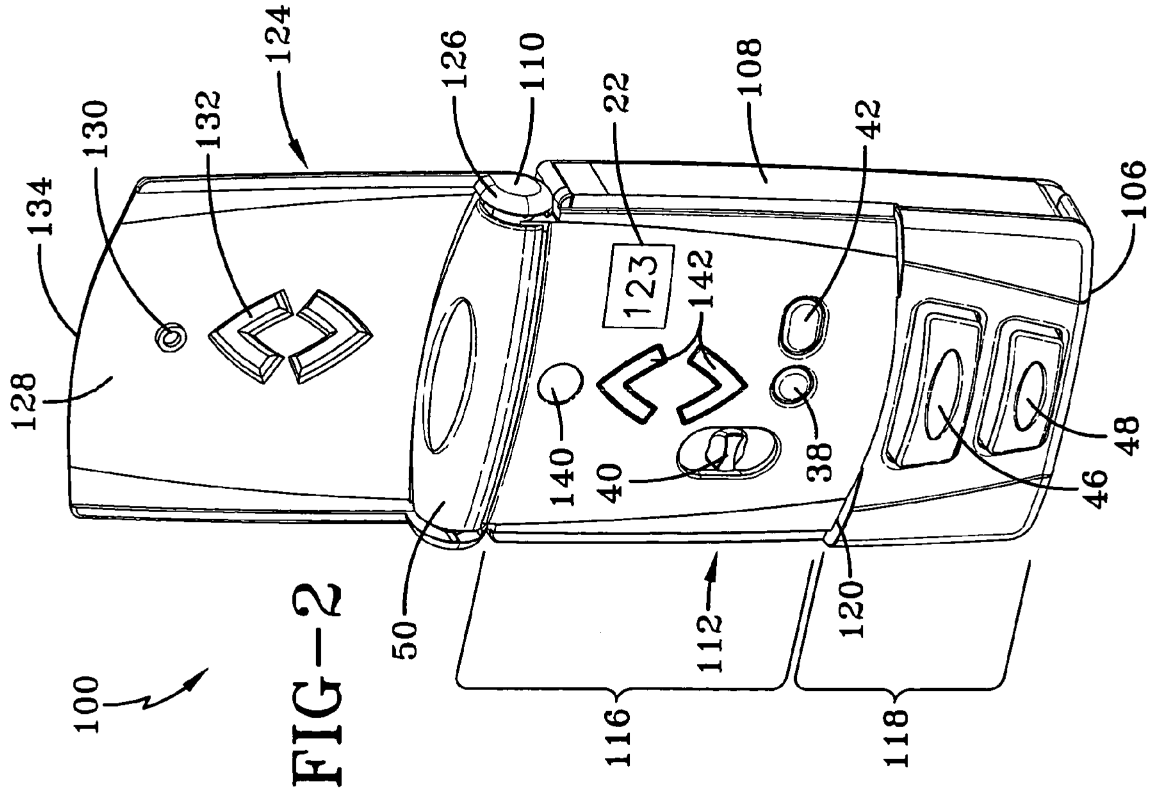
FIG. 2 is a front perspective view of a multi-function wall station embodying the concepts of the present invention.

An operating system for a motorized door or gate operator according to the concepts of the present invention, depicted in FIG. 1 of the drawings, is generally indicated by the numeral 10. The system 10 may be employed in conjunction with a wide variety of movable barrier doors or gates, wherein the doors are of the type utilized in garages, commercial and utility buildings, and other structures, as well as windows or other closure members, all of which may be linear, curved, or otherwise non-linear, in whole or in part. Such barriers or other members are commonly constructed of a variety of materials such as wood, metal, various plastics, or combinations thereof. The lower extremity of doors or other member of these various types may be substantially rectangular or may be profiled in any number of ways for the positioning of reinforcing members or other purposes. In the preferred use, the present invention is utilized with residential-type garage doors. Generally, the system 10 of the present invention employs a multi-function wall station generally designated by the numeral 12. The wall station 12 is typically placed near a pedestrian door that enters the garage from the interior of the house and is positioned at a convenient height, preferably five feet above the ground. The wall station 12 includes a housing typically made of polymeric material, wherein at least a portion of the housing is removable to allow access to the internal workings thereof when needed.

The wall station 12 includes a battery compartment 15 (best seen in FIG. 5) for receiving a power supply 16 which is preferably two AAA dry cell batteries. The power supply is used to provide electrical power to various components contained within the wall station as will become apparent as the description proceeds. It will be appreciated that power could be received from a residential power source or equivalent if desired. If such is the case then appropriate transformers will be needed to power the internal components. In any event, use of the dry cell batteries provide the necessary power and allow for the wall station to be placed anywhere within communication range of the operator and eliminates the need for obtaining power directly from the operator or other source. One component which is connected to the power supply is a logic control 18 which is a microprocessor based circuit that provides the necessary hardware, software and memory for implementing the functions to be described. An LED 20 is connected to the logic control and receives power from the power supply 16 in a manner well known in the art. Also connected to the logic control 18 may be a liquid crystal display 22 or other low-power display for providing operational information related to the wall station 12 and/or other components of the operating system 10.

The logic control 18 generates various signals 26 which are used by a transmitter 28 for conversion to a radio frequency signal (RF) that is emitted by an antenna 30. Of course other wireless types of signals, such as infrared or acoustic, could be generated by the transceiver 28 if desired. The transmitter may also function as a transceiver to allow for display of operator status information on liquid crystal display 22. As used herein, the term "transceiver" indicates that the device can both transmit and receive wireless signals. In any event, it will be appreciated that in the preferred embodiment the wall station 12 is a wireless device; however, if the need arises a wire could be used to directly transmit the signal 26.

The wall station 12 includes a plurality of input switches or buttons designated generally by the numeral 36. These input switches, when actuated, allow the user to control various features of the operating system. The switches 36 include an up/down switch 38; a 3-way selection switch 40, which provides the modes of manual close, auto-close, and radio frequency blocking; an install switch 42; a delay close switch 46; a pet height switch 48; and a light on/off switch 50. The up/down switch 38 is actuated whenever the user wants to move the barrier from an up condition to a down condition or vice versa. The 3-way selection switch 40 provides for different operational modes. Briefly, the manual close mode allows the operating system 10 to operate in much the same manner as would a normal operating system inasmuch as user input is required to open and close the movable barrier. The auto-close feature allows for the movable barrier to close if left in a fully open position for a predetermined period of time and provided that other conditions are met. The radio frequency blocking feature is for when a user is on vacation and desires that no external or remote transmitters allow for operation of the movable barrier. The install switch 42 provides for an installation routine to set the operational limits of the movable barrier with respect to the other physical parameters of the movable barrier. In other words, barrier travel limits and force profiles are generated during the actuation of the install routine. The delay close switch 46 allows for a user to exit the enclosed area within a predetermined period of time without inadvertently actuating safety features such as photoelectric eyes and the like. The pet height switch 48 allows for the door to be moved to a minimal open position of anywhere from 4 to 12 inches to allow the ingress and egress of small pets. The light switch 50 may be activated in either of two directions and turns a light associated with the operating system 10 on or off.

The operating system 10 includes an operator which is designated generally by the numeral 56. The operator 56 includes an antenna 58 for receiving the RF signal 32 or any other type of signal associated with other transmitters. In any event, the received radio frequency signal 58 is transmitted to a transceiver 60 which converts the radio frequency signal into a code signal 62 that is received by a controller 64. Alternatively, the controller 64 may receive the data signal 26 directly by a wire as previously discussed. The controller 64 provides the necessary hardware, software and memory for use of the operating system 10. Associated with the controller 64 may be a LED program light 66 which indicates the operational status of the controller 64. The controller 64 is coupled to a motor 68. The controller 64 receives various types of operational signals such as the commands from the various transmitters, safety signals from any connected safety devices, and status signals from the motor to coordinate movement of the barrier. The motor controls movement of the barrier through various drive mechanisms. A light 72 may be associated with the controller 64 for the purpose of illuminating the area enclosed by the barrier. A speaker 73 is also connected to the controller and may be used to announce a programming state or mode. A transmitter program button 74 is connected to the controller for the purpose of allowing programming of the wireless control devices such as the wall station, remote transmitters and the like to the operator 56. The transmitter program button 74 must be actuated to place the operating system in a program mode for the purpose of learning any one of the transmitters disclosed herein to the controller. And a safety sensor 75 may be connected to the controller 64. The sensor 75 may be a photo-electric safety sensor, a door edge sensor or any other sensor that detects application of an excessive force or of an object in the barrier's path by the moving door in either one or both directions.

One of the external transmitters that may be associated with the operator 56 is a keyless external transmitter designated generally by the numeral 76. The keyless transmitter 76 provides an antenna 78 for transmitting and, if needed, receiving signals to and from the operator 56. The keyless transmitter 76 includes a keypad 80 which allows for the user to enter a predetermined identification number or code to initiate movement of the barrier. A liquid crystal display 82 may be associated with the keyless transmitter if desired. In any event, upon completion of the entry of the identification number a radio frequency signal 84 is emitted by the antenna 78 and received by the antenna 78 for transmission to the transceiver 60.

Another type of external transmitter is a remote transmitter designated generally by the numeral 90. The remote transmitter 90 provides an antenna 92 which emits a radio frequency signal 94 for receipt by the transceiver 60. It will be appreciated that the remote transmitter 90 may include its own controller for the purpose of generating the appropriate radio frequency signal. Fixed code or rolling code technology may be used for communication of the transmitters with respect to the operating system 56. The remote transmitter may include a plurality of function buttons 96 that independently control other features associated with the operating system. In particular, actuation of one of the buttons may be used solely for control of the door/gate or barrier while another of the buttons may independently control the light 72 associated with the operating system or other related features.

Referring now to FIGS. 2–5 it can be seen that the wall station 12 utilizes a housing designated generally by the numeral 100. The housing 100, which may either be mounted by a screw, tape or other fastener, is secured to a wall in radio frequency range of the operator and includes a back panel 102 that faces the wall surface. Connected to the back panel 102 is a side panel 104 and a bottom panel 106. A battery cover 108 is coupled to the housing 100 and is preferably positioned on a side opposite the side panel 104. The battery cover 108 is selectively detachable from the housing 100 and retains the power supply 16. The housing 100 also includes a pair of axially extending pins 110 that are preferably positioned at a top edge of the panel 102. Extending from the housing 100 and facing outwardly is a front panel 112 which may be segmented into three sections. One section comprises the light switch 50 and is positioned at a top edge of the housing. The light switch 50 is preferably actuable from two different directions. In other words, if a person desires to actuate just the light 72 associated with the operator 56, then the light switch may be actuated in one of two directions. The light switch can be actuated by applying a downward force or a normal force with respect to the front panel 112. The front panel 112 also includes a recessed panel 116 which is disposed between the light switch 50 and an exposed panel 118. A partition 120 may be provided to separate the recessed panel and the exposed panel.

A hinge cover 124 is attached to the housing 100 and is movable with respect thereto. In the preferred embodiment the hinge cover is made of a translucent or transparent polymeric material. The cover 124 includes a pair of opposed collars 126 which slidably rotate about the axial pins 110. If desired, the collars 126 may be cammed in such a way that the cover 124 may be rotatably opened and stay in place while the user accesses the recessed panel 116 without having to manually hold the cover 124. The cover 124 provides an interior surface 128 that faces the recessed panel 116 when the cover is closed. Extending from the interior surface 128 is a projecting nub 130 which functions as a force transmitting member. Also provided in the interior surface 128 is a diffuser 132 which will be discussed in further detail. Opposite the top edge of the hinge cover 124 is a distal edge 134 which nests or mates with the partition 120 when the cover is closed. Opposite the interior surface 128 is an exterior surface 136. Provided on the exterior surface 136 is a depression 138 which is substantially opposite the location of the projecting nub 130. Alternatively, any distinguishable tactile surface may be used in place of the depression.

Figure 5:
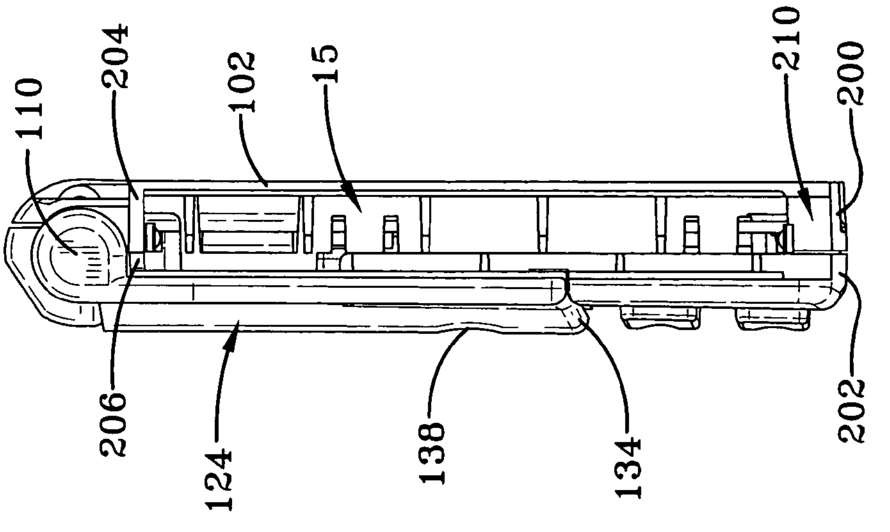
FIG. 5 is a side elevational view of the multi-function wall station with the battery cover removed.
Figure 4:
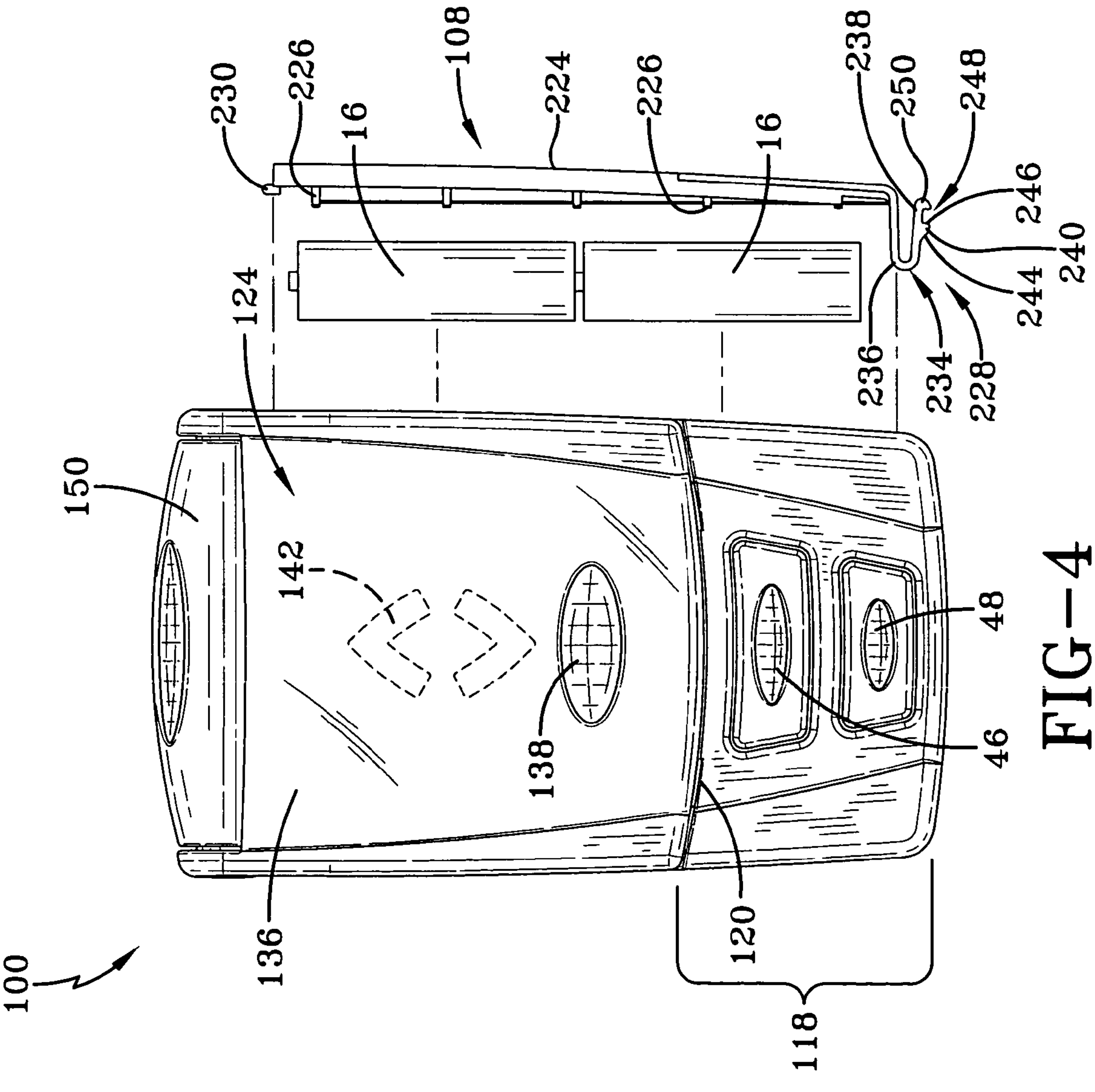
FIG. 4 is a front exploded elevational view of the multi-function wall station with the hinge cover in a closed position.

As best seen in FIGS. 4 and 5, when the hinge cover is closed, only the light switch 50, the delay close switch 46 and the pet height switch 48 are exposed. Accordingly, the recessed panel 116 is covered by the cover 124. Those components provided in the recessed panel area 116 include the up/down switch 38, the 3-way selection switch 40, the installation switch 42 and, if provided, the liquid crystal display 22. Also provided in the recessed panel area is a mounting hole 140 which allows for receipt of a screw or fastener for mounting of the wall station to the desired surface. Also provided on the recessed panel 116 is a light pipe 142 which transmits light illuminated by the light emitting diode or diodes 20. During operation, the LED's 20 blink at a predetermined rate of about once per second. With the hinge cover closed, the LED's emit a light that is captured by the light pipe 142. The diffuser 132 is positioned directly over the light pipe when the cover is closed and light is emitted outwardly therefrom. Accordingly, in a darkened enclosure area, the user can easily find the location of the wall station when the cover is illuminated so as to allow for actuation of the light switch 50. And with the hinge cover in the closed position it will be appreciated that all of the buttons maintained on the recess panel are covered and not readily accessible. However, by providing a projecting nub 130 opposite the depression area 138 a user can easily find this depression area from the light emitted by the LEDs and by pressing the depression area 138 a resulting force is transmitted by the nub 130 to actuate the switch 38. Accordingly, the hinge cover itself functions as an open/close button when the cover is in a closed position. When the cover is in a closed position and pressed it is allowed to rotate or move as needed so as to permit full actuation of the switch 38 without actuating any of the other buttons or damaging any of the components maintained on the recess panel 116.

The hinge cover is made of a translucent or transparent material so that the LEDs may illuminate the entire surface of the hinge cover. However, if desired, a label may be placed on the inside surface of the hinge cover to provide instructions to the user. The diffuser area 132 will not be covered by the label so as to permit transmission of light from the light pipe 142 through the cover so as to be viewable by the user.

With the hinge cover in the closed position, the user may access four of the buttons associated with operation of the operating system 56. In particular, the user may actuate the light switch 50 by pressing the top edge or front top edge of the housing. The second button that may be actuated is the up/down switch by pressing the hinge cover so as engage the button 38 with the force member 130. The other two exposed buttons are the delay closed switch 46 and the pet height switch 48. The hinge cover 124 allows for selected concealment of the other switches maintained on the recess panel as previously indicated. The 3-way selection button 40 provides for three different options as determined by the end user. The first option, which is a default option, is for the manual close of the barrier. In other words, in this mode the user is only able to open and close the door by actuating the up/down switch 38, or by actuation of the remote transmitter 90 or the keypad transmitter 76 that has been programmed to the operator. In the second mode, the user may select an auto-close embodiment. In this mode the garage door or barrier may close after a predetermined period of time from its placement in an open position. This allows the user to have a level of confidence that the enclosure surrounded by the barrier is closed after a period of time in the event that a down button is forgotten to be pushed after leaving the garage, or the garage is left open after entering the building. In order for this feature to be fully enabled in a preferred embodiment, the switch is placed in the auto-close mode, whereupon the operator will respond by blinking the light 72 or emitting an audible sound from the speaker 73 for a predetermined period of time such as 60 seconds. During this time a correct identification number must be entered on the keypad 76. If the ID number is accepted, confirmation of the auto-close feature is communicated by flashing the light 72 on and off a predetermined number of times. While in the auto-close mode all other programmed transmitters may be used to control movement of the barrier. Requiring the programming of the keypad 76 ensures that the user has some way of re-entering the area enclosed by the barrier in the event of closure. The third option for the 3-way selector switch is disablement of all operator operation except for return to one of the other two modes provided by the switch. This may also be referred to as a “vacation lock” mode wherein the opener operating system 10 will not respond to any transmitter open signal. In other words, the only way to open and/or close the barrier is by moving the 3-way selector back to the default manual open/close switch or to the auto-close position followed by activation of the open/close switch of a transmitter or wall station up/down command. Open or close signals received from the programmed transmitters, whether the wall station, a hand held remote or a keyless entry pad, will be ignored by the controller 64.

Figure 6:
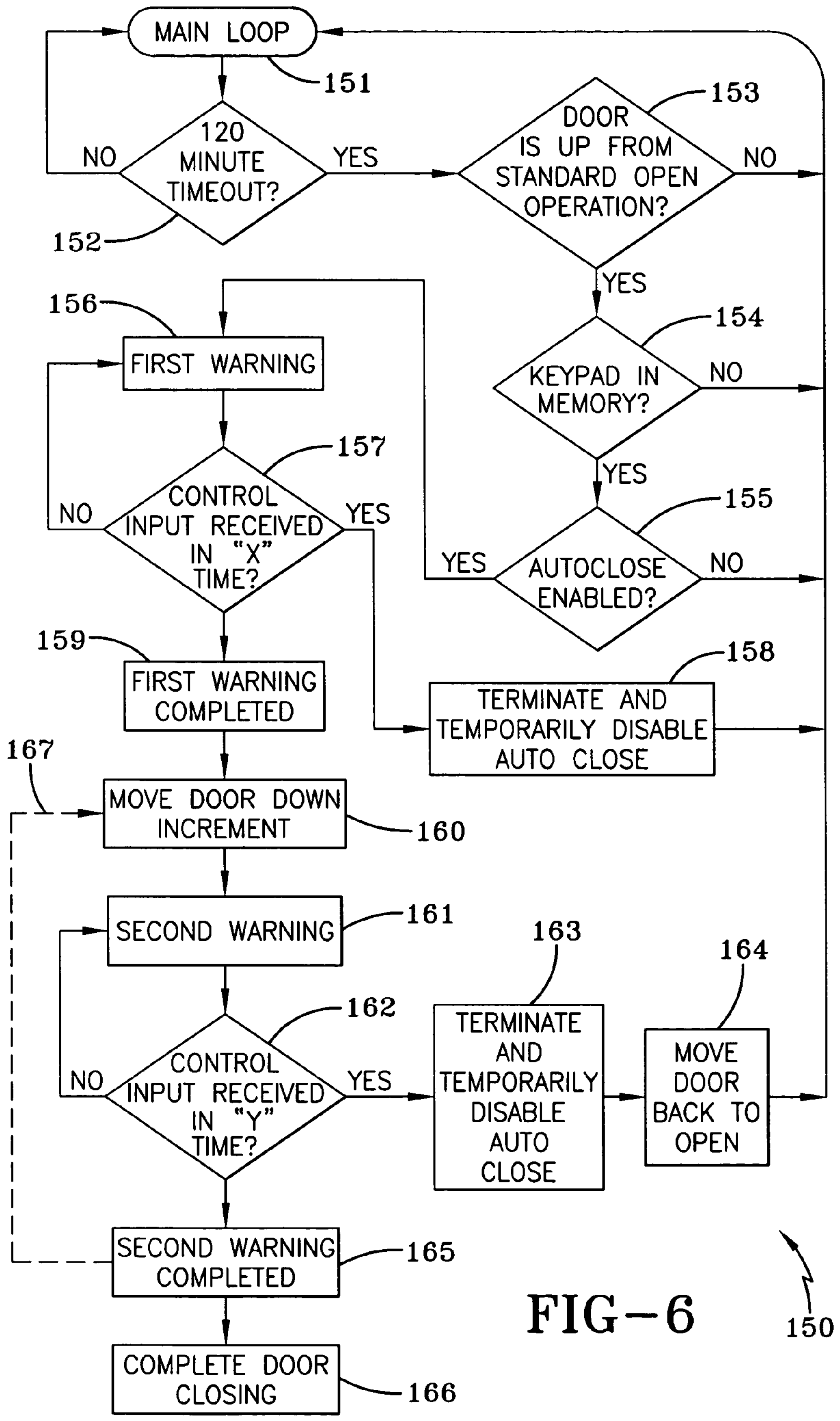
FIG. 6 is an operational flowchart setting out the operational steps for the auto-close feature.

Referring now to FIG. 6, it can be seen that an operational flow chart designating steps for enabling an auto-close feature is designated generally by the numeral 150. Initially, at step 151, the controller cycles through a main loop and the steps taken herein are a portion of that main loop. At step 152, a timer is investigated to determine whether a predetermined period of time has expired which in the preferred embodiment is one hundred twenty minutes. If the timer has not expired, the flow chart returns to step 151. If, however, it is determined that the one hundred twenty minute timer has expired the process proceeds to step 153.

The following three steps are queried to determine whether the necessary requirements are in place for initiation of an auto-close door movement. Accordingly, at step 153 the process determines whether the door is in a complete up position resulting from a standard open operation. In other words, the controller determines whether the door is in a fully up limit position and confirms that the door is in this up position as a result of a normal door operation. If the door is in the up position as a result of safety reversal or interrupted auto-close door movement then the process is returned to the main loop 151 until such time that a correct and successful door open operation is completed. Following step 153 the controller determines whether a keypad transmitter has been programmed to operate the controller at step 154. If not, the process proceeds or returns to step 151. If a keypad transmitter has been properly entered then the process continues on to step 155 to confirm that the auto-close switch has been selected and that a valid keypad transmitter has been received after the auto-close switch position has been selected. If not, the process again returns to step 151. If however, the auto-close feature has been determined to be -enabled at step 155 then the process proceeds to step 156 where a first warning is initiated. This warning may be in the form of flashing of the light 72 or emission of a series of beeps from an audible speaker if connected to the controller. If during the warning signal period of about 10 seconds or some other time period a control input is received at step 157, then at step 158 the auto-close procedure is terminated and temporarily disabled and the process returns to step 151. This temporary disablement of the auto-close feature is discontinued upon a correct and successful door open operation. In any event, upon completion of the warning signal period at step 159 lo a first door down movement or increment, at step 160, is initiated. This results in the door moving a predetermined length of travel such as three to six inches from the fully-open limit position and the controller initiates a stop and pause and then initiates a second warning period of about 10 seconds or some other time period at step 161. If any type of control input is then received at step 162 during the warning period then at step 163 the auto-close procedure is terminated and once again that feature is temporarily disabled. The process then continues at step 164 and the door is returned to its fully open position and then the process returns to step 151. This temporary disablement is not withdrawn until a successful open procedure is implemented. If however, at step 165 the second warning period is completed without any control input being received then the process proceeds to step 166 and a complete door closing procedure is implemented.

In a variation of the foregoing process, it will be appreciated that the process may continue at step 167—from step 165—and only move down an increment so as to periodically move the door, issue a warning, and then move the door again. Accordingly, the door is closed after completion of a series of door movement increments. This feature is envisioned for use where the door’s downward force is at a higher level and the incremental movement provides an added precaution.

If it is desired, the controller 64 may be programmed so as to allow the user to adjust the timer associated with the auto-close function. This may be implemented in any number of ways and an exemplary way would likely incorporate opening the cover so as to expose the buttons on the recess panel. The user might then simultaneously hold one or more of the buttons wherein the display 22 provides the information regarding the amount of time associated with the auto-close feature. It is envisioned that the auto-close feature would be limited to a range of time such as from fifteen minutes to two hours. The display could also provide an operational status of the system.

Figure 7:
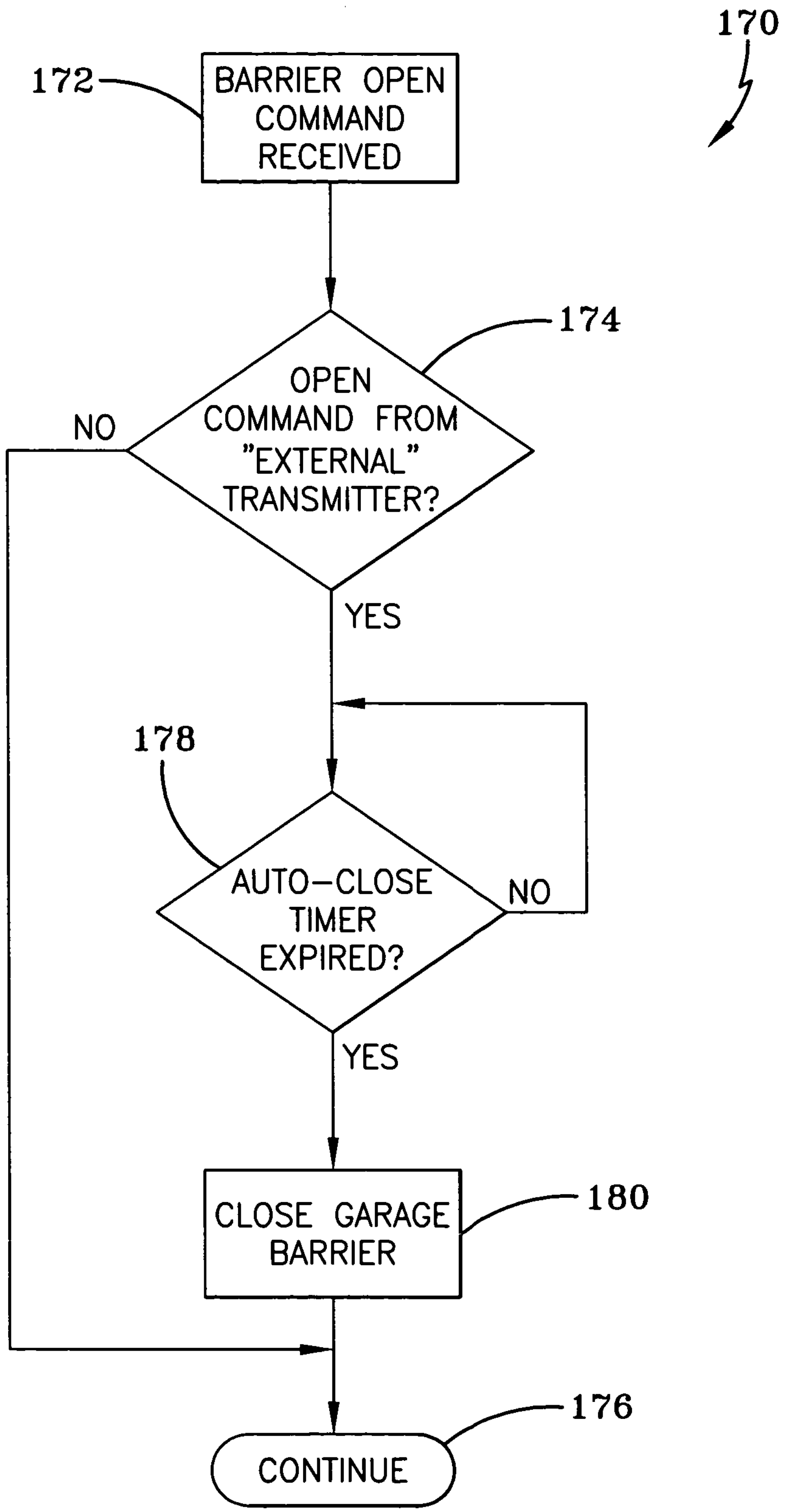
FIG. 7 is an operational flowchart wherein the auto-close feature is only enabled if an open command is received from an external transmitter.

Referring now to FIG. 7, operational steps are designated generally by the numeral 170 for an embodiment which is automatically initiated by the controller. In other words, the auto-close feature is only enabled upon actuation of an open command from an "external transmitter," which in this embodiment means the keyless transmitter or any remote transmitter. For example, any transmitter other than a wall station transmitter. At step 172 a barrier open command is received by the controller and the door is opened. Next, at step 174, the controller determines from what type of transmitter device the open command was received from. If the open command was not received from an external transmitter, in other words, the open command was received from the wall station, then the process proceeds to step 176 to continue with normal operation. If however, at step 174, the opening command was received from an external transmitter such as a keyless entry device or a remote transmitter then the process proceeds to step 178 and the auto-close timer is enabled. At step 178, the auto-close timer is continually queried as to whether the timer has expired and once it has, then the process proceeds to step 180 so as to execute the auto-close steps designated in the flow-chart 150. The process then continues at step 176 and proceeds with the other features of the control system.

This feature of the system ensures that the door will not be inadvertently closed unless the user has the ability to re-open the barrier with a keyless entry device or a remote transmitter. Additionally, it will be appreciated that the specific type of external transmitter may be specified in the controller software program and wherein the preferred embodiment the type of external transmitter is limited to a keyless entry device.

Figure 8:
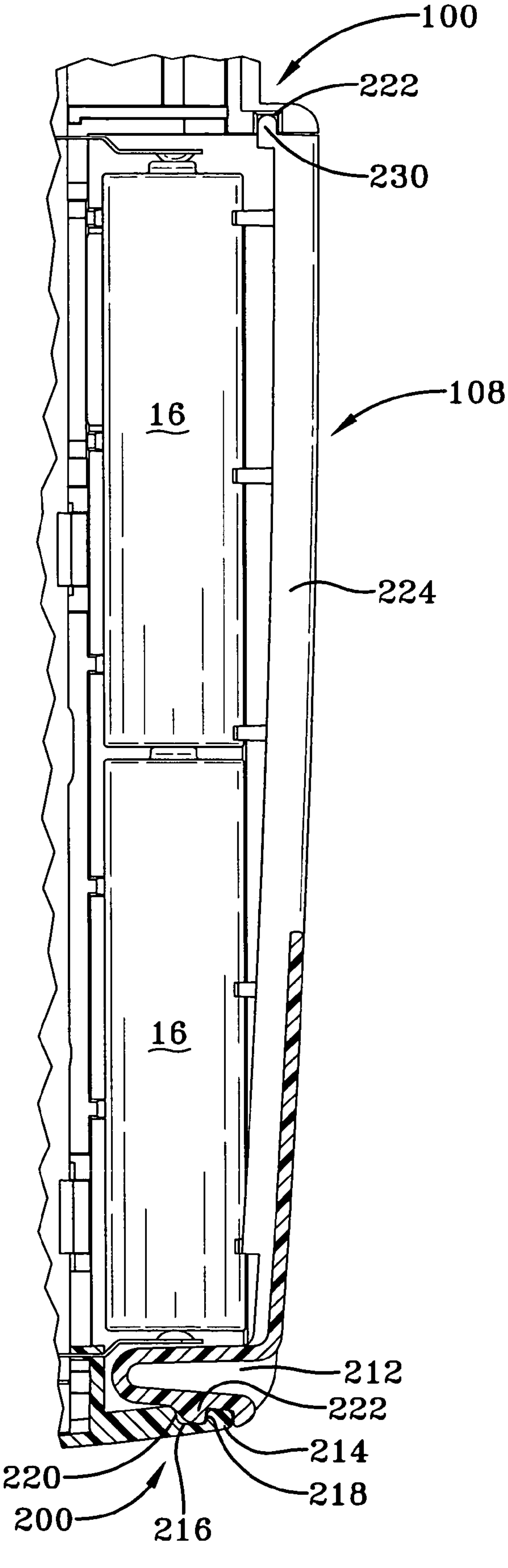
FIG. 8 is a partial elevational view of the housing's battery compartment with a front panel of the housing removed.

Referring now to FIGS. 4, 5 and 8 it can be seen that the battery cover 108 is detachably securable to the housing 100. The housing includes the back panel 102 from which extends a back ledge 200 and a panel ledge 202. The back ledge 200 extends from the back panel 102 toward the front panel 112 at the bottom edge of the housing while the panel ledge 202 extends from the front panel toward the back panel. In a similar manner, a back ridge 204 extends from the back panel toward the front panel and a panel ridge 206 extends from the front panel 112 toward the back panel 102 at a top edge of the housing. It will be appreciated that the back ledge 200 and the panel ledge 202 form a substantially continuous ledge from the back panel toward the front panel. In a similar manner, the panel back ridge 204 and the panel ridge 206 form a substantially continuous ridge. The ledges 200, 202; the ridges 204, 206; and the panels 102, 112 define the battery compartment 15. Included within the battery compartment 15 is a hinge cavity 210. The back panel provides a panel edge surface 212 from which extends the ledge 200. The ledges include a nub 214 which does not extend fully to the outer periphery of the edge surface 212. Adjacent the nub 214 and positioned inwardly toward the hinge cavity 210 is a groove 216. The groove 216 provides a catch surface 218 and a stop surface 220 which forms a portion of the nub 214. The ridges 204, 206 form a notch 222 within the battery compartment 15.

The cover 108 is detachably secured to the housing 100 and in particular it covers the battery compartment 208 including the hinge cavity 210. As best seen in FIGS. 4 and 8, the battery cover includes a wall 224 which has a plurality of inwardly extending ribs 226 along the inwardly facing surface thereof. The ribs 226 function to securely hold the batteries 16 in place with the cover 108 attached to the housing. The wall 224 includes a catch 228 at a bottom end and a latch 230 at a top end. The latch 230 extends inwardly—in the same direction as the ribs 226—and upwardly from a top edge of the wall 224 and is receivable in the notch 222.

The catch 228 includes a U-shaped member 234 which includes a pivot point 236. Extending from the pivot point is a lever arm 238 from which extends a retainer 240 that has a ramp surface 244 and a corner surface 246. Also extending in the same direction as the retainer 240 is a finger 250 which preferably does not extend beyond the panel edge surface 212 when the cover is installed. Formed between the retainer 240 and the finger 250 is a slot 248. When the battery cover 108 is installed, the retainer 240 is mateably received within the groove 216 and the nub 214 is received in the slot 248. Moreover, the corner surface 246 is in juxtaposition to the stop surface 220 while the ramp surface 244 is in juxtaposition to the catch surface 218.

After the batteries 16 are installed in the compartment 15 the cover is installed by first angularly positioning the latch 230 into the notch 222. The cover 108 is then rotated inwardly so that the U-shaped member 234 is received into the hinge cavity 210. As the lever arm 238 engages the ledges 200, 202, the ramp surface 244 contacts the nub 214. At this time lever arm 238 is deflected at the pivot point 236 until such time that the retainer 240 clears the nub 214. As soon as the corner surface 246 passes the trailing edge of the nub 214, the retainer 240 is received in the groove 216 by virtue of the spring-like nature of the catch 234. Likewise, the slot 248 is nested around the nub 214 wherein the finger 250 partially surrounds the nub.

Removal of the battery cover is essentially accomplished by reversal of the above steps. In particular, the user will insert their fingernail or some other force transmitting member between the finger and the nub so as to deflect the lever arm upwardly at the pivot point. This disengages the catch 228 from the groove 216. The catch 228 is then moved such that the latch 230 rotates slightly and then the cover is withdrawn from the notch 222. It will be appreciated that the battery cover construction, which is mateable with the housing 100, is advantageous inasmuch as the catch mechanism has two mating or nesting surfaces. In particular, the retainer 240 is received in the groove 216 while the nub 214 is received in the slot 248. Accordingly, this construction along with the flexible nature of the catch allows for easy removal of the cover without the need for other tools such as a screwdriver which would otherwise damage the battery cover. Accordingly, the present construction is an improvement over previously known battery covers employed with wall station transmitters.

Based upon the foregoing, the advantages of the present invention are readily apparent. In regard to the multi-function wall station, it provides a means for disabling the operator from receiving radio frequencies or other wireless transmission signals for all operational commands of the operator from any "external" transmitter. And the 3-way selection switch provides a way to activate and deactivate the auto-close feature. The lighted feature of the wall station is also believed to be unique inasmuch as it assists the user finding the wall station in a dimly lit environment. Yet another advantage of the present invention is that the up/down button is associated with a hinged cover that prevents accidental depression of the other operational controls which are not commonly used. Still yet another advantage of the present invention is that two different motions are allowed to activate the operator-controlled garage lights wherein one of the switches is along the top of the wall station that can be located by sliding one's hand down the wall to activate and the other of the switches is on the outward face of the wall station for conventional horizontal motion activation. The wall station being battery powered also provides the benefit of eliminating the need for a wired wall station so as to remove unsightly wires and to significantly reduce installation time of the unit. In this regard, the wall station housing can be placed in any unrestricted location as long as it is within range of the wireless signal in communication with operator and within sight of the door.

The invention is also advantageous in that the auto-close feature is provided directly with the operator control systems. As such, additional add-on components are not required for operation of the auto-close feature and the operation of the auto-close feature is greatly improved in regard to durability and implementation of all the other features in combination therewith. The delay function is adjustable if desired and the auto-close feature can be disabled or disarmed and returned to a manual-remote operation if needed.

Still yet another advantage of the present invention is that it may only be enabled and operational if a keyless entry transmitter has been taught to the garage door operator. Accordingly, if the user is outside of the garage or house and the auto-close feature automatically closes the garage door that person can use the externally mounted keyless entry transmitter to open the garage door. Conversely, if a keyless entry transmitter has not been taught to the garage door operator then the door will never close automatically by the auto-close feature. Yet another embodiment of the present invention is advantageous in that the auto-close timer is only activated if the door has received a command to move from a remote transmitter such as a hand-held transmitter or a keyless entry keypad.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator system for moving a barrier comprising:

a motor for moving the barrier between opened and closed positions;

an operator for controlling operation of said motor;

a wall station having a wall station transmitter for sending operational signals to said operator;

an open/close switch for directly actuating said motor to move the barrier between opened and closed positions, said open/close switch carried by said wall station; and a manual-close/auto-close selector switch carried by said wall station, wherein if an auto-close mode is selected from said selector switch, said operator automatically closes the barrier if left open for a predetermined period of time and moves the barrier upon actuation of the open/close switch, and wherein if a manual-close mode is selected from said selector switch, said operator moves the barrier upon actuation of said open/close switch.

2. The operator system according to claim 1, wherein said wall station comprises:

a panel carrying said open/close switch and said selector switch; and a cover positionable with respect to said panel, wherein said cover in a first position permits access to said switches and in a second position conceals both of said switches while allowing forcible movement of said cover to permit actuation of said open/close switch concealed by said cover without actuating said selector switch.

3. The operator system according to claim 2, wherein said cover comprises:

an exterior surface;

an interior surface opposite said exterior surface;

a nub extending from said interior surface and in juxtaposition with said open/close switch when said cover is in said second position; and said cover movable in said second position to allow actuation of said open/close switch with said nub.

4. The operator system according to claim 3, wherein said exterior surface has a distinguishable tactile surface opposite said nub.

5. The operator system according to claim 1, further comprising:

a keyless entry transmitter capable of sending operational signals to said operator and moving the barrier in the appropriate direction, wherein said operator will only enable said auto-close mode if said keyless entry transmitter is learned to said operator.

6. The operator system according to claim 1, further comprising:

at least one external transmitter capable of sending operational signals to said operator and moving the barrier in the appropriate direction, wherein said operator will only enable said auto-close mode if said at least one external transmitter is learned to said operator.

7. The operator system according to claim 6, wherein said at least one external transmitter is selected from a group consisting of a keyless entry transmitter and a portable remote transmitter.

8. The operator system according to claim 1, wherein said predetermined period of time is adjustable and wherein said wall station transmitter also functions as a transceiver.

9. The operator system according to claim 1, wherein said wall station transmitter generates wireless operational signals received by said operator.

10. An operator system for moving a barrier comprising:

a motor for moving the barrier between opened and closed positions;

an operator for controlling operation of said motor;

a wall station having a wall station transmitter for sending operational signals to said operator;

an open/close switch carried by said wall station for actuating said motor to move the barrier in the appropriate direction;

at least one other switch carried by said wall station, which generates some type of operational signal for receipt by said operator;

a panel carrying said open/close switch and said at least one other switch; and a cover positionable with respect to said panel, wherein said cover in a first position permits access to said switches and in a second position conceals each of said switches while allowing activation of only said open/close switch concealed by said cover by movement of said cover;

wherein said at least one other switch comprises:

an auto-close/blocking selector switch, wherein if said selector switch is in an auto-close mode, said operator automatically closes the barrier if left open for a predetermined period of time, and wherein if said selector switch is in a blocking mode, said operator is precluded from receiving operational signals from any source other than said wall station.

11. The operator system according to claim 10, further comprising:

a light controlled by said operator; and a light switch carried by said wall station, wherein said light switch is actuable by applying a force in one of two directions.

12. The operator system according to claim 10, wherein said cover comprises:

an exterior surface;

an interior surface opposite said exterior surface;

a nub extending from said interior surface and in juxtaposition with said open/close switch when said cover is in said second position; and said cover movable in said second position to allow actuation of said open/close switch with said nub.

13. The operator system according to claim 12, wherein said exterior surface has a distinguishable tactile surface opposite said nub.

14. An operator system for moving a barrier comprising:

a motor for moving the barrier between opened and closed positions;

an operator for controlling operation of said motor; and a wall station having a wall station transmitter for sending operational signals to said operator, said wall station having an open/close switch for immediately actuating said motor to move the barrier between open and closed positions said operator capable of receiving operational signals from said wall station transmitter and any programmed transmitter; and a manual-close/auto-close/block switch carried by-said wall station, wherein if a manual-close mode is selected said operator moves the barrier upon receipt of a signal from one of said open/close switch and said programmed transmitter;

wherein if an auto-close mode is selected said operator automatically closes the barrier if left open for a predetermined period of time; and wherein if a block mode is selected, said operator is precluded from receiving operational signals from any source other than said wall station transmitter.

15. The operator system according to claim 14, wherein said wall station comprises:

a panel carrying said open/close switch and said selector switch; and a cover positionable with respect to said panel, wherein said cover in a first position permits access to said switches and in a second position conceals each of said switches while allowing activation of said open/close switch concealed by said cover by movement of said cover.

16. The operator system according to claim 15, wherein said cover comprises:

an exterior surface;

an interior surface opposite said exterior surface;

a nub extending from said interior surface and in juxtaposition with said open/close switch when said cover is in said second position; and said cover movable in said second position to allow actuation of said open/close switch with said nub.

17. The operator system according to claim 16, wherein said exterior surface has a distinguishable tactile surface opposite said nub.

18. The operator system according to claim 14, wherein said operator generates a warning signal immediately prior to said operator automatically closing the barrier.

19. The operator system according to claim 18, wherein said operator incrementally closes the barrier a predetermined distance after completion of the said warning signal, unless one of said operational signals is received during said warning signal.

20. The operator system according to claim 19, wherein said operator generates a second warning signal after said incremental closing and prior to said operator automatically closing the barrier.

21. The operator system according to claim 20, wherein said operator closes the barrier after completion of said second warning signal, unless one of said operational signals is received during said warning signal.

22. The operator system according to claim 14, wherein said operator generates a warning signal immediately prior to said operator incrementally closing the barrier a predetermined distance, whereupon said operator repeats generation of said warning signal and incremental closing until the barrier is completely closed.

23. The operator system according to claim 22, wherein the barrier is returned to an open position if one of said warning signals is received during said warning signal.

* * * * *